Oct. 24, 1950 L. S. TOOGOOD 2,526,783

WIND AND REWIND MACHINE FOR MAGNETIC RECORDING MEDIA

Filed Aug. 6, 1945 2 Sheets-Sheet 1

INVENTOR.
Loren S. Toogood

BY John F. Eakins

ATTORNEY

INVENTOR.
Loren S. Toogood
BY John F. Eakins
ATTORNEY

Patented Oct. 24, 1950 2,526,783

UNITED STATES PATENT OFFICE 2,526,783

WIND AND REWIND MACHINE FOR MAGNETIC RECORDING MEDIA

Loren S. Toogood, La Grange, Ill., assignor to J. P. Seeburg Corporation, Chicago, Ill., a corporation of Illinois Application August 6, 1945, Serial No. 609,187

12 Claims. (Cl. 242—54)

This invention relates to machines for winding and rewinding wire recording media and is applicable to machines for making recordings, machines for reproducing such recordings and to machines which are capable of both these functions.

The invention relates primarily to a drive system for winding or rewinding at will from a single motor and to a switch control associated therewith.

One of the objects of the invention is to provide an improved power drive for winding and rewinding magnetic recording media.

A further object of the invention is to provide an improved switch system associated with the reversible drive.

Other objects, advantages and capabilities of the invention will appear from the following description of a preferred embodiment thereof taken in conjunction with the accompanying drawings, in which Figure 1 is an elevational view of a machine embodying my invention;

Figure 1:
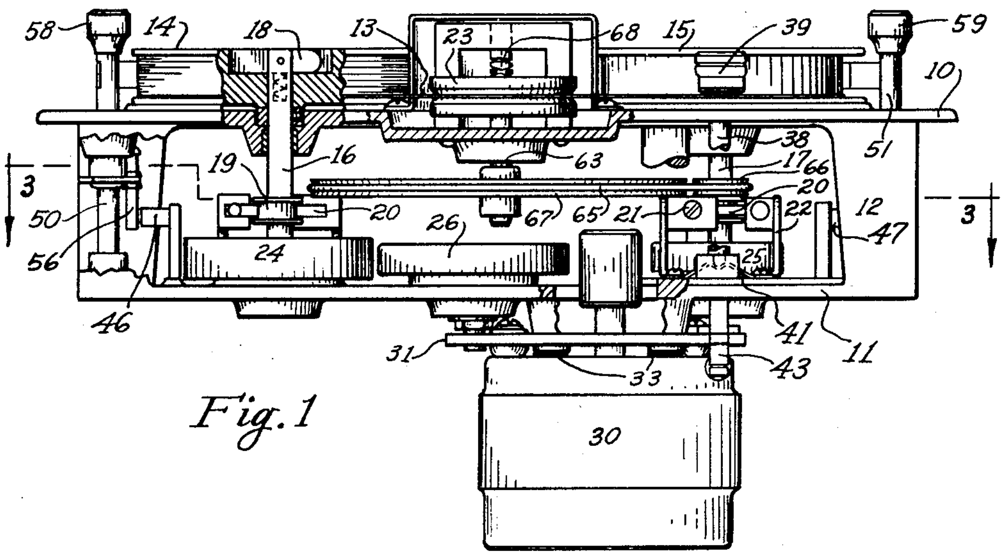
Figure 5:
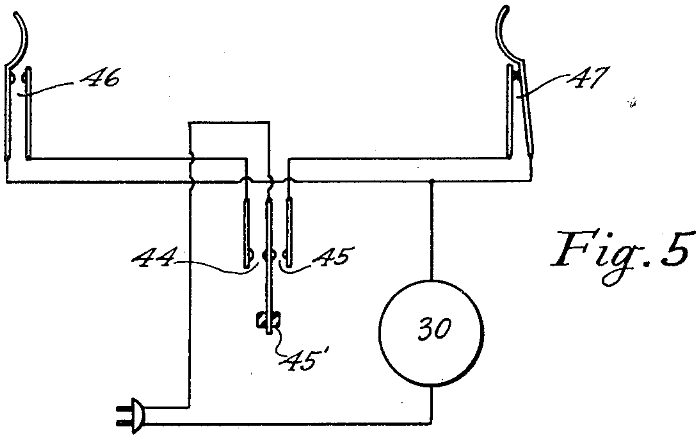
Fig. 5 is a wiring diagram.
Figure 4:
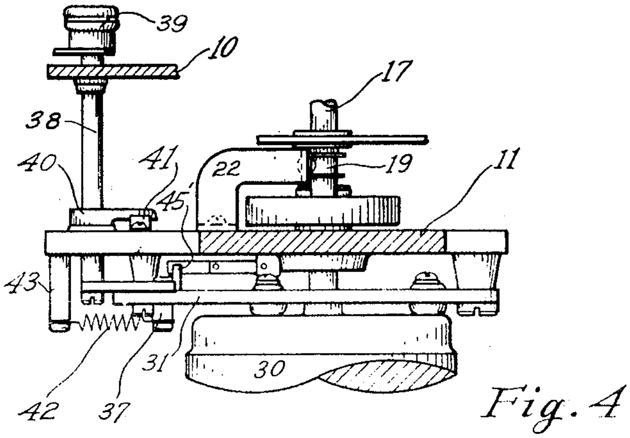
Fig. 4 is a fragmentary sectional elevation taken on the line 4—4 of Fig. 2.

The machine as a whole is carried on a mounting panel 10 which together with a spaced parallel plate 11 and spacers 12 constitute the main frame of the machine. The recording media, which may suitably be wire 13 is carried on two spools 14 and 15 mounted on the outer side of the panel 10 on shafts 16 and 17 respectively. The spools are retained on the shafts by means of spring pressed levers 18 which are pivotally mounted in slots in the outer extremities of the shafts and are arranged so that they can be turned around into slots on the outer face of the spools so that the spools are rigidly mounted on the shafts. The shafts are rotatably mounted in bearings on the plates 10 and 11.

Each shaft carries a small brake drum 19 which is arranged to be engaged by a strip 20. The pressure exerted by the strip 20 is adjustable by means of a screw 21. The strips 20 and the screws 21 are carried by brackets 22 mounted on the plate 11.

One of the spools, for example spool 15, serves as the supply spool and the other is the take-up spool. Most of the wire is initially on the spool 15 and to start recording or reproducing the spool 14 is driven so as to draw the supply of wire through the head 23. After the bulk of the wire has been transferred from the spool 15 to the spool 14 the drive stops and the spool 15 is driven in the reverse direction so as to return the bulk of the wire to the spool 15. The drive of the spools and also the limit switches which terminate the drive when a desired quantity of the wire is transferred from one spool to the other will hereinafter be described. The shaft 16 carries a rigid wheel 24. A rubber idler 26 is arranged to engage the wheel 24. The idler 26 is mounted on an arm 27 which is mounted on the under side of the plate 11. The shaft of the idler 26 extends upwardly through a slot 28 in the plate 11 and the idler 26 is biassed away from the wheel 24 by means of a spring 29. The slot 28 permits movement of the arm 27 to bring the idler into and out of engagement with the wheel 24. The shaft 17 carries a rubber tired wheel 25.

Figure 2:
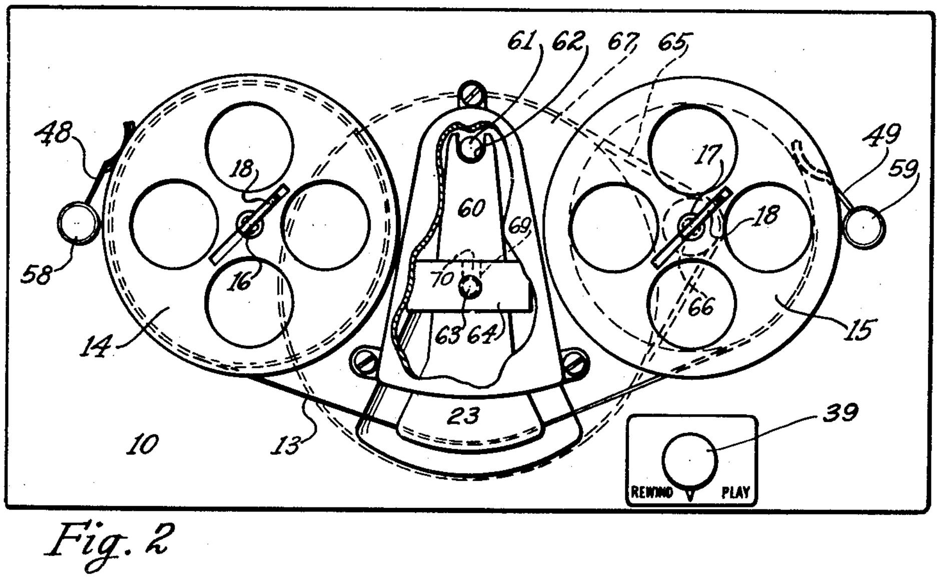
Fig. 2 is a plan view thereof.
Figure 3:
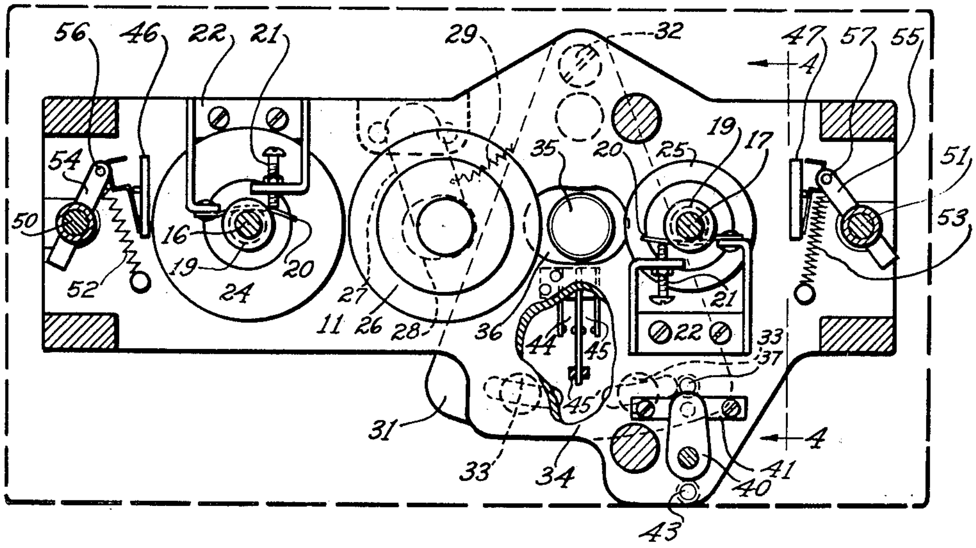
Fig. 3 is a sectional plan view taken on the line 3—3 of Fig. 1.

The spools 14 and 15 are driven by means of a motor 30 which is mounted on the under side of a plate 31. The plate 31 is pivotally mounted at 32 on the under side of the plate 11 and is also supported by means of screws 33 carried by the plate 11 and extending through arcuate slots 34 in the plate 31. The shaft of the motor carries a driving wheel 35 which extends upwardly through a slot 36 in the plate 11 so that it may engage either the idler 26 or the wheel 25. The plate 31 is arranged to be swung into wind, rewinding and neutral positions by means of a crank pin 37 which is carried at the lower end of a shaft 38. The shaft 38 is rotatably mounted in the plates 10 and 11 and at its upper end it carries an actuating button 39. The crank pin 37 extends downwardly through a slot in the plate 31. The shaft 38 carries an arm 40 which cooperates with a spring detent 41 on the upper side of the plate 11 so as to hold the shaft 38 in neutral position. This position is shown in Fig. 3 and it is to be noted that the wheel 35 is out of engagement with both the idler 26 and the wheel 25. An over-center spring 42 connected to the crank pin 37 and to a pin 43 on the other side of the shaft 38 from the crank pin 37 maintains the plate 31 and the motor 30 in either the wind or rewinding position. The button 38 is shown in neutral position in Fig. 2. When it is rotated in the clockwise direction the plate 31 and the motor 30 are swung to the right so that the wheel 35 engages the wheel 25 to drive the spool 15. This is the rewind position. The wheel 35 is held against the wheel 25 by the spring 42. When the button 39 is swung in the opposite direction the plate 31 and the motor 30 are carried to the left so that the wheel 35 engages the idler 26 and swings it into engagement with the wheel 24. The overcenter spring 42 applies pressure between the wheel 35 and the idler 26 and between the idler 26 and the wheel 24. Consequently the motor drives the spool 14 for recording and play back.

It is preferred to control the motor circuit by the movements of the motor plate 31 and preferably also by limit switches which break the motor circuit when sufficient wire has been wound or rewound, as the case may be. For this purpose I preferably provide a single pole double throw switch 44, 45 adjacent the motor plate 31. One power line is connected to one terminal of the motor 30. The other power line is connected to the pole of the switch 44, 45. The pole of the switch 44, 45 is engaged by a piece of insulation 45′ carried by the plate 31 so as to move therewith. The other side of the switch 44 is connected to a normally closed limit switch 46 which is associated with the spool 14 and the other side of the switch 45 is connected to a normally closed limit switch 47 associated with the spool 15. The other sides of the switches 46 and 47 are connected to the other terminal of the motor 30. Two contact arms 48 and 49 are arranged to engage the wire on the spools 14 and 15 respectively. These arms are carried on shafts 50 and 51 which are rotatably mounted in the plates 10 and 11. The arms 48 and 49 are biassed towards the wire on the spools 14 and 15 respectively by springs 52 and 53 which are connected to the plate 11 and to arms 54 and 55 rigidly carried by the shafts 50 and 51 respectively. The arms 54 and 55 carry pins 56 and 57 which are adapted to engage the control arms of the switches 46 and 47 respectively which may suitably be microswitches. The shafts 50 and 51 are provided with buttons or handles 58 and 59 respectively so that the arms 48 and 49 may be swung clear of the spool positions when the spools are being mounted on or removed from the machine.

A level wind is provided to insure even distribution of the wire on the receiving spool. This level wind suitably includes the recorder or pickup head 23 which engages the wire between the spools 14 and 15. The head 23 is carried on a plate 60 which is guided for movement by a pin 61 which is parallel to the shafts 16 and 17 and is located in a slot 62 in the plate 60. A shaft 63 rotatably supported in the plate 10 extends through a block 64 on the plate 60. The shaft 63 is driven from the shaft 17 by means of a belt 65 which passes around pulleys 66 and 67 carried by the shafts 17 and 63 respectively. Shaft 63 has an endless thread 68 which is engaged by a detent 69 carried by a small cylinder 70 which is rotatably mounted in the block 64. It will thus be understood that during winding or rewinding the shaft 63 is driven and that the head 23 is moved upwardly and downwardly so as to distribute the wire evenly over the take-up spool. The pitch of the thread 68 and the relative speed of rotation of the shaft 63 are coordinated so as to provide close and uniform distribution of the wire on the take-up spool. The operation is as follows:

The button 39 is in neutral position so that the motor plate 31 is in neutral position and both switches 44 and 45 are open so that the motor is not operating. The full spool is applied to the shaft 17 and the relatively empty spool is applied to the shaft 16 and the wire is properly engaged with the slot in the head 23 and the wire is made taut by manual manipulation of one of the spools. The manual manipulation of the buttons 58 and 59 which the mounting of the spools entails has no effect on the motor circuit which is open at the switches 44 and 45. The arm 48 contacts the relatively empty spool and the pin 56 holds the switch 46 closed. The button 39 is now moved in counterclockwise direction swinging the motor plate 31 in clockwise direction closing the switch 44 and bringing the wheel 35 into contact with the idler 26 and bringing the idler into contact with the wheel 24. The circuit of the motor is now completed through the closed switches 44 and 46 and the motor drives the spool 14 in clockwise direction to take up the wire from the spool 15. As the wire is transferred to the spool 14 the arm 48 is progressively rotated in the counterclockwise direction and when the spool 14 is filled to the desired extent the pin 57 permits the switch 46 to open thus breaking the motor circuit. This is arranged to occur when only a small length of wire remains on the spool 15. During this transfer of the wire a recording signal is applied to the head 23 or a recording signal is derived therefrom for reproduction. In either event it is necessary to rewind the wire onto the spool 15. The switch 47 is now closed since the arm 48 has moved inwardly of the spool 15. The button 39 is now rotated through its neutral position into its rewind position swinging the motor plate 31 in the counterclockwise direction, bringing the wheel 35 into engagement with the wheel 25 and closing the switch 45. The motor circuit is now completed and the motor goes into operation to drive the spool 15 in counterclockwise direction thus rewinding the wire. As the wire is returned to the spool 15 the arm 49 moves progressively outwards and when substantially all the wire has been rewound the pin 57 permits the switch 47 to open thus terminating the operation of the motor. The button 39 is now moved to its neutral position and the spools may be removed.

While either spindle may be employed to carry the pickup spool during recording or sound reproduction, I prefer to employ the shaft 16, that is the shaft driven through the idler 26 for this purpose. The drive wheels 35 and 24 are rigid wheels. The idler 26 is resilient, being preferably made of rubber or rubber-like material. I find that higher fidelity is attained when operating in this manner which is apparently due to more uniform speed through the resilient idler 26. Variations of pressure have no effect on the relative speeds between the wheels 35 and 24 since the idler 26 is equally deformed in its two radii directed toward the wheels 35 and 24. The drive wheel 25, which is preferably used to drive the rewind wheel is suitably rubber tired. The speed of the rewind wheel is not so important but in order to reduce the time necessary for rewind it is preferred to make the wheel 25 substantially smaller than the wheel 24.

Although the invention has been described in connection with the specific details of a preferred embodiment thereof, it must be understood that such details are not intended to be limitative of the invention except in so far as set forth in the accompanying claims.

Having thus described my invention I declare that what I claim is:

1. In a wind and rewind machine for magnetic recording media, in combination, a pair of spindles arranged to carry spools for the transfer of media from one spool to the other, a drive wheel on each spindle, an idler wheel arranged to engage one of said drive wheels, means biassing said idler out of engagement with the last mentioned drive wheel, an electric motor carrying a drive wheel, and means for movably supporting said motor whereby its drive wheel may be moved into engagement with the idler wheel to cause it to engage its associated spindle drive wheel, or into engagement with the other spindle drive wheel whereby either spindle may be driven by the motor to effect wind or rewind of the magnetic media from either spool to the other.

2. In a wind and rewind machine for magnetic recording media, in combination, a pair of spindles arranged to carry spools for the transfer of media from one spool to the other, a drive wheel on each spindle, an idler wheel operatively associated with one spindle, an electric motor carrying a drive wheel, means for movably supporting said motor whereby its drive wheel may be moved into engagement with the idler wheel associated with said one spindle or with the drive wheel of the other spindle whereby either spindle may be driven by the motor to effect wind or rewind of the magnetic media from either spool to the other, and releasable means for maintaining the supporting means at a neutral position with the motor drive wheel out of engagement with the idler and out of engagement with said other spindle drive wheel.

3. In a wind and rewind machine for magnetic recording media, in combination, a pair of spindles arranged to carry spools for the transfer of media from one spool to the other, a drive wheel on each spindle, an idler wheel operatively associated with one spindle, an electric motor carrying a drive wheel, means for movably supporting said motor whereby its drive wheel may be moved into engagement with the idler wheel associated with said one spindle or with the drive wheel of the other spindle whereby either spindle may be driven by the motor to effect wind or rewind of the magnetic media from either spool to the other, releasable means for maintaining the supporting means at a neutral position with the motor drive wheel out of engagement with the idler and out of engagement with said other spindle drive wheel, and over-center spring means for biassing the supporting means into either of the operative positions of the motor.

4. In a machine for winding magnetic recording media for playing and recording, in combination, a spindle for carrying a take-up spool for receiving media during playing or recording, a rigid drive wheel on said spindle, a motor having a rigid drive wheel for driving said spindle, an idler wheel having its peripheral portion of resilient material interposed between said drive wheels, means normally holding said idler wheel clear of said rigid wheels, and actuable means for establishing operative engagement between the idler wheel and both said rigid wheels.

5. In a machine for winding magnetic recording media for playing and recording, and for rewinding the media thereafter, in combination, a spindle carrying a take-up spool for receiving media during playing or recording, a rigid drive wheel on said spindle, an idler wheel having its peripheral portion of resilient material arranged to engage said drive wheel, a second spindle carrying a spool to serve as a supply spool during playing or recording and as a take-up spool during rewinding, a drive wheel having its peripheral portion of resilient material on the last mentioned spindle, a movable motor including a rigid drive wheel arranged to engage either of said wheels having their peripheral portions of resilient material, means normally maintaining the motor drive wheel clear of the wheels having their peripheral portions of resilient material, and means normally maintaining the idler wheel clear of the rigid spindle wheel.

6. In a wind and rewind machine for magnetic recording media, in combination, a pair of spindles arranged to carry spools for the transfer of media from one spool to the other, a drive wheel on each spindle, an idler wheel arranged to engage one of said drive wheels, means biassing said idler out of engagement with the last mentioned drive wheel, an electric motor carrying a drive wheel, means for movably supporting said motor whereby its drive wheel may be moved into engagement with the idler wheel to cause it to engage its associated spindle drive wheel, or into engagement with the other spindle drive wheel whereby either spindle may be driven by the motor to effect wind or rewind of the magnetic media from either spool to the other, a releasable means for maintaining the supporting means in neutral position with the motor drive wheel out of engagement with the idler wheel and the spindle drive wheel, said idler having its peripheral portion of resilient material and the drive wheels engaged thereby being of rigid material.

7. In a wind and rewind machine for magnetic recording media, in combination, a pair of spindles arranged to carry spools for the transfer of media from one spool to the other, a drive wheel on each spindle, an idler wheel arranged to engage one of said drive wheels, means biassing said idler out of engagement with the last mentioned drive wheel, an electric motor carrying a drive wheel, means for movably supporting said motor whereby its drive wheel may be moved into engagement with the idler wheel to cause it to engage its associated spindle drive wheel, or into engagement with the other spindle drive wheel whereby either spindle may be driven by the motor to effect wind or rewind of the magnetic media from either spool to the other, and means for maintaining the supporting means in neutral position with the motor drive wheel out of engagement with the idler wheel and the spindle drive wheel, over-center spring means for biassing the supporting means into either of the operative positions of the motor, said idler wheel having its peripeheral portion of resilient material and the drive wheels engaged thereby being of rigid material.

8. In a wind or rewind machine for magnetic recording media, in combination, a pair of spindles arranged to carry spools for the transfer of media from one spool to the other, drive means associated with each spindle, and an electric motor provided with drive means, means for movably supporting said motor whereby its drive means may be moved into engagement with the drive means of either spindle to effect wind or rewind of the magnetic recording media from either spool to the other, and switch means actuable by said supporting means for completing the motor circuit when the supporting means is moved into either of its operating positions.

9. In a wind and rewind machine for magnetic recording media, in combination, a pair of spindles arranged to carry spools for the transfer of media from one spool to the other, drive means associated with each spindle, and an electric motor provided with drive means, means for movably supporting said motor whereby its drive means may be moved into engagement with the drive means of either spindle to effect wind or rewind of the magnetic recording media from either spool to the other, yielding means for maintaining said supporting means in neutral position and switch means actuable by said supporting means for opening the motor circuit when the supporting means is in neutral position and for completing the motor circuit when the supporting means is moved into either of its operating positions.

10. In a wind or rewind machine for magnetic recording media, in combination, a pair of spindles arranged to carry spools for the transfer of media from one spool to the other, drive means associated with each spindle, and an electric motor provided with drive means, means for movably supporting said motor whereby its drive means may be moved into engagement with the drive means of either spindle to effect wind or rewind of the magnetic recording media from either spool to the other, switch means actuable by said supporting means for completing the motor circuit when the supporting means is moved into either of its operating positions, and limit switch means arranged to cooperate with the media to open the motor circuit when a predetermined amount of the media has been transferred.

11. In a wind and rewind machine for magnetic recording media, in combination, a pair of spindles arranged to carry spools for the transfer of media from one spool to the other, drive means associated with each spindle, and an electric motor provided with drive means, means for movably supporting said motor whereby its drive means may be moved into engagement with drive means of either spindle to effect wind or rewind of the magnetic recording media from either spool to the other, switch means actutable by said supporting means for completing the motor circuit when the supporting means is moved into either of its operating positions, and a limit switch associated with each spool and arranged to break the motor circuit when a predetermined amount of media has been transferred to the take-up spool.

12. In a wind and rewind machine for magnetic recording media, in combination, a pair of spindles arranged to carry spools for the transfer of media from one spool to the other, drive means associated with each spindle, an electric motor provided with drive means, means for movably supporting said motor whereby its drive means may be moved into engagement with the drive means of either spindle to effect wind and rewind of the magnetic recording media from either spool to the other, first and second normally closed limit switches associated with the first and second spools, respectively, and arranged to be opened when a pre-determined amount of media is built up on the associated spool, third and fourth switches actuable by said supporting means so that the third switch is closed when the motor is driving the first spool, the fourth switch is closed when the motor is driving the second spool, and both the third and fourth switches are open in the neutral position of the supporting means, the third switch being connected in series to the first switch and the fourth switch being connected in series to the second switch to provide two parallel circuits, and a pair of power lines, one connected to the motor and the other connected to one side of both parallel circuits, the other side of said parallel circuits being connected to the motor.

LOREN S. TOOGOOD.

REFERENCES CITED

The following references are of record in the file of this patent:

UNITED STATES PATENTS

| Number | Name | Date |
|---|---|---|
| 947,148 | Browne | Jan. 18, 1910 |
| 1,642,681 | Kaplan | Sept. 20, 1927 |
| 2,886,856 | Warwick | Nov. 8, 1932 |
| 2,369,017 | Camras | Feb. 6, 1945 |